United States Patent [19]
Yin et al.

[11] Patent Number: 5,953,517
[45] Date of Patent: Sep. 14, 1999

[54] METHOD OF OPTIMIZING COMPONENT LAYOUT USING A PATTERN BASED SEARCH

[75] Inventors: Su Yin; Jonathan Cagan, both of Pittsburgh, Pa.

[73] Assignee: Carnegie Mellon University, Pittsburgh, Pa.

[21] Appl. No.: 08/974,783

[22] Filed: Nov. 20, 1997

[51] Int. Cl.$^6$ .................................................. G06F 3/00
[52] U.S. Cl. ................. 395/500.1; 364/149; 364/474.13
[58] Field of Search .................................. 364/149, 488, 364/489, 500.1, 474.13

[56] References Cited

U.S. PATENT DOCUMENTS

| | | | |
|---|---|---|---|
| 5,249,133 | 9/1993 | Batra | 364/489 |
| 5,381,343 | 1/1995 | Bamji et al. | 364/498 |
| 5,495,419 | 2/1996 | Rostoker et al. | 364/468.28 |
| 5,513,119 | 4/1996 | Moore et al. | 364/491 |
| 5,519,628 | 5/1996 | Russell et al. | 364/489 |
| 5,557,533 | 9/1996 | Koford et al. | 364/491 |
| 5,604,680 | 2/1997 | Bamji et al. | 364/491 |
| 5,682,322 | 10/1997 | Boyle et al. | 395/500.1 |

OTHER PUBLICATIONS

Hooke, R., et al., "Direct Search Solution of Numerical and Statistical Problems", Journal of the Association for Computing Machinery, 8(2): 212–29, 1961.

Szykman, S., et al., "A Simulated Annealing–Based Approach to Three–Dimensional Component Packing," Transactions of the ASME, vol. 117, Jun. 1995, pp. 308–314.

Kolli, A., et al., "Packing of Generic, Three–Dimensional Components Based on Multi–Resolution Modeling," Proceedings of the 1996 ASME Design Engineering Technical Conferences and Computers in Engineering Conference, Aug. 18–22, 1996.

Szykman, S., et al., "Constrained Three–Dimensional Component Layout Using Simulated Annealing," Transactions of the ASME, vol. 119, Mar. 1997, pp. 28–35.

Virginia Torczon et al., *From Evolutionary Operation To Parallel Direct Search: Pattern Search Algorithms For Numerical Optimization*, Department of Computer Science, College of Williams & Mary, Williamsburg, VA.

Robert Michael Lewis et al., *Pattern Search Algorithms For Bound Constrained Minimization*, Institute for Computer Applications in Science and Engineering, NASA Langley Research Center, Hampton, VA.

Robert Michael Lewis et al., *Rank Ordering And Positive Bases In Pattern Search Algorithms*, Institute for Computer Applications in Science and Engineering, NASA Langley Research Center, Hampton, VA.

Virginia Torczon, *On The Convergence Of Pattern Search Algorithms*, Siam J. Optim., vol. 7, No. 1, pp. 1–25, Feb. 1997.

IEEE/ACM International Conference On Computer–Aided Design, Nov. 7, 1993, Santa Clara, CA, USA, pp. 164–169, Hyunchul Shin et al. *A Combined Hierarchical Placement Algorithm*.

(List continued on next page.)

*Primary Examiner*—William Grant
*Assistant Examiner*—Chad Rapp
*Attorney, Agent, or Firm*—Kirkpatrick & Lockhart LLP

[57] ABSTRACT

The present invention is directed to a method of, and apparatus for, solving a packing or layout problem by applying a pattern based search technique to an initial component configuration. By interactively working through a series of new or "then current" configurations, an optimal component configuration is determined based on a predetermined criterion. According to one embodiment of the invention, at least one perturbation is introduced during the course of the search. The perturbation may be introduced by swapping component positions, increasing move size, or any other activity which breaks or interrupts the pattern of a normal pattern based search.

26 Claims, 7 Drawing Sheets

OTHER PUBLICATIONS

Computer Aided Design, vol. 22, No. 2, Mar. 1990, London, GB, pp. 97–108, Montreuil, Requirements For Representation Of Domain Knowledge In Intelligent Environments For Layout Design.

M. D. Huang, et al., *An Efficient General Cooling Schedule For Simulated Annealing*, 1986, IEEE, pp. 281–284.

Simon Szykman, et al., *Automated Generation of Optimally Directed Three Dimensional Component Layouts*, pp. 527–537 DE–Vol. 65–1 Advances in Design Automation—vol. 1 ASME 1993.

METHOD OF OPTIMIZING COMPONENT LAYOUT USING A PATTERN BASED SEARCH

BACKGROUND OF THE INVENTION

1. Field of the Invention

The present invention is directed generally to an apparatus and method for solving packing and component layout problems.

2. Description of the Background

Several research efforts have been directed to the solution of component layout problems wherein the components must be located in such a fashion that certain spatial constraints are satisfied. These spatial constraints often consist of orientation, proximity, or overlap conditions, among others.

Numerous approaches have been presented to overcome the inherent problems of layout under such constraints. The operations research approach, often evidenced in packing problem solutions, typically presents a layout which cannot account for various types of spatial constraints and complex geometries. The ability to adjust to such constraints is vital if a solution is to be applied to general engineering problems, particularly in three dimensions.

The optimization approach frequently used to simulate a three dimensional component layout situation represents a non-linear approach. That approach gives rise to another set of difficulties: feasible starting points are required, linear approximations are used for non-linear equations, or highly complex mathematical operations, such as gradients, must be used, leading to a greater chance of error and local convergence.

Other approaches have been developed to overcome component layout problems. One of the most widely used new approaches, both in academics and in industry, is the simulated annealing algorithm. That technique overcomes some of the difficulties presented by complex geometries or restrictions on spatial movements. In the simulated annealing optimization technique, an initial state is chosen as a starting point and evaluated. A random step is then taken and evaluated, and, if the step has improved the value of the objective function (the mathematical representation of the goals and series of constraints to which the design is subject), that step is chosen as the new current design state.

If the step leads to an inferior design state, it is assigned a probability. That probability is a function of a decreasing parameter called "temperature," based on an analogy with the annealing of metals. The temperature parameter allows for a very broad view of the objective function layout space at the starting condition, and allows the algorithm to eventually converge on the most promising areas of the objective function as time progresses. It is this convergence on only the most promising areas of the objective function which allows this technique to partially remedy a great problem in component layout objective function problems—convergence on a local, rather than a global, optimum. However, depending on the complexity of the geometric model used, calculation time for this method could be quite lengthy.

Yet another approach has added the use of a plurality of models to the simulated annealing method. This approach uses simplistic geometric models early in the simulated anneal when large step sizes are likely to be used for high temperatures. Later in the process, complex geometric models are used when mostly small steps are being taken at low temperatures. Such variation in models improved calculation time to some degree, and allowed for optimization in three dimensions.

Pattern direct search algorithms are a subset of direct search algorithms introduced in Hooke, R., et al., "Direct Search Solution of Numerical and Statistical Problems," Journal of the Association for Computing Machinery, 8(2): 212–29, 1961, which is herein incorporated by reference. Hooke describes various parameters that are varied in pattern based search algorithms. Pattern direct search algorithms, which were used to solve curve fitting problems, follow a series of exploratory moves defined by pattern matrices to walk through a design space to search for a stationary point. The algorithms rely on direct comparisons of function values during the search, and thus provide a suitable tool for the exploration of a nonlinear and combinatorial design space.

However, the central problem of the objective function settling on an inferior local optimum still exists even with these techniques. Furthermore, due to the number of calculations needed, the running times of even the fastest of these optimization methods are still problematic. Thus, the need exists for a method that provides the advantages of a pattern based technique with its ability to handle complex geometries and constraints, while preventing convergence on an inferior local optimum, and yet reduces the calculation time for the optimization.

SUMMARY OF THE INVENTION

The present invention is directed to a method of, and apparatus for, solving a packing or layout problem, with or without component selection, by applying a pattern based search technique to an initial component configuration. By interactively working through a series of new or "then current" configurations, an optimal component configuration is determined based on a predetermined criterion. According to one embodiment of the invention, at least one perturbation is introduced during the course of the search. The perturbation may be introduced by swapping component positions, increasing move size, or any other activity which breaks or interrupts the pattern of a normal pattern based search.

According to another embodiment of the invention, a plurality of models is generated for each component to be placed in the layout. The models are used for evaluating each of the then current configurations to determine if the then current configuration shows any improvement over the previous configuration. However, for some applications, such as a two-dimensional circuit layout, there may be only one model for each component.

The present invention provides an improvement in speed of 10–100 times over the prior art. Such improvements are seen in both two and three dimensional layout problems. Furthermore, the method of the present invention can be subjected to any number of movement operations of the components, any constraints on the layout, as well as multiple objective functions, with no change in the routine followed. Finally, the randomness of the process and the perturbations provided prevent the objective function from settling on inferior local optima.

BRIEF DESCRIPTION OF THE DRAWINGS

For the present invention to be clearly understood and readily practiced, the present invention will be described in conjunction with the following figures wherein.

DESCRIPTION OF THE PREFERRED EMBODIMENTS

Figure 1:
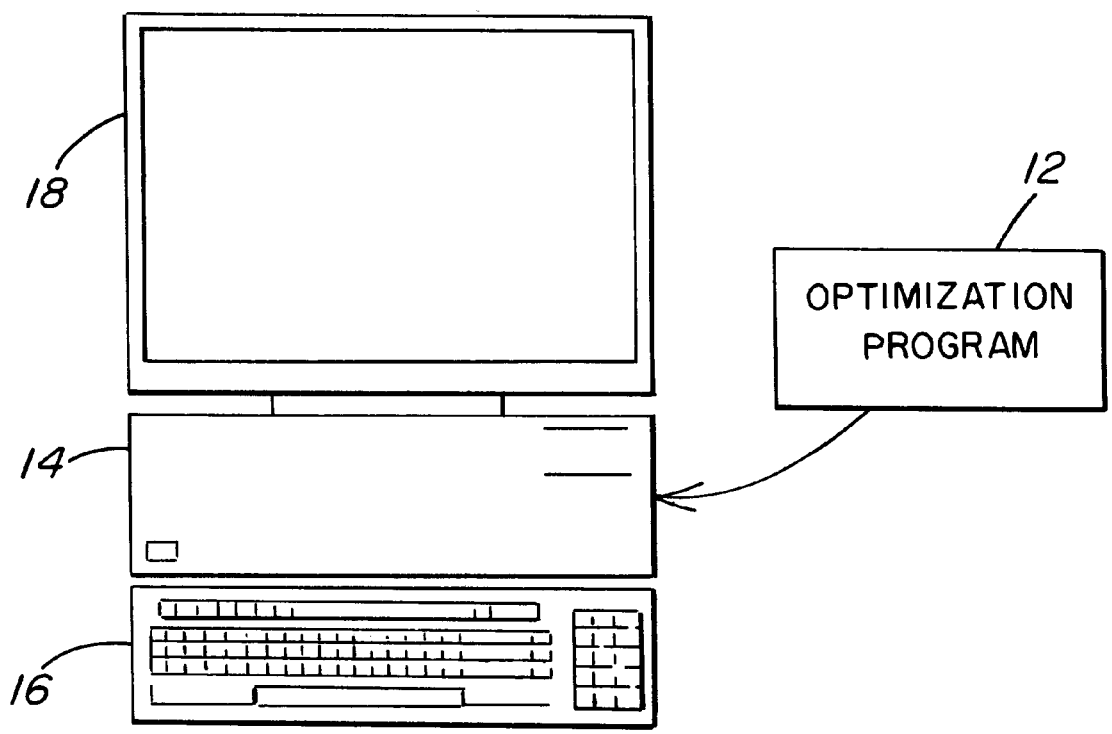
FIG. 1 illustrates a hardware platform on which the method of the present invention may be practiced.

The present invention is directed to a method 10 (shown in FIGS. 2A, 2B) of performing a modified pattern based search on a plurality of components to determine an optimal arrangement of the components. In FIG. 1, the preferred embodiment, the method 10 is embodied in an optimization computer program 12. The computer program 12 may be executed on a commercially available computer 14 which has connected to it a conventional keyboard 16 and a monitor 18.

The present invention is not limited by the particular hardware platform on which it is practiced.

Figure 2A:
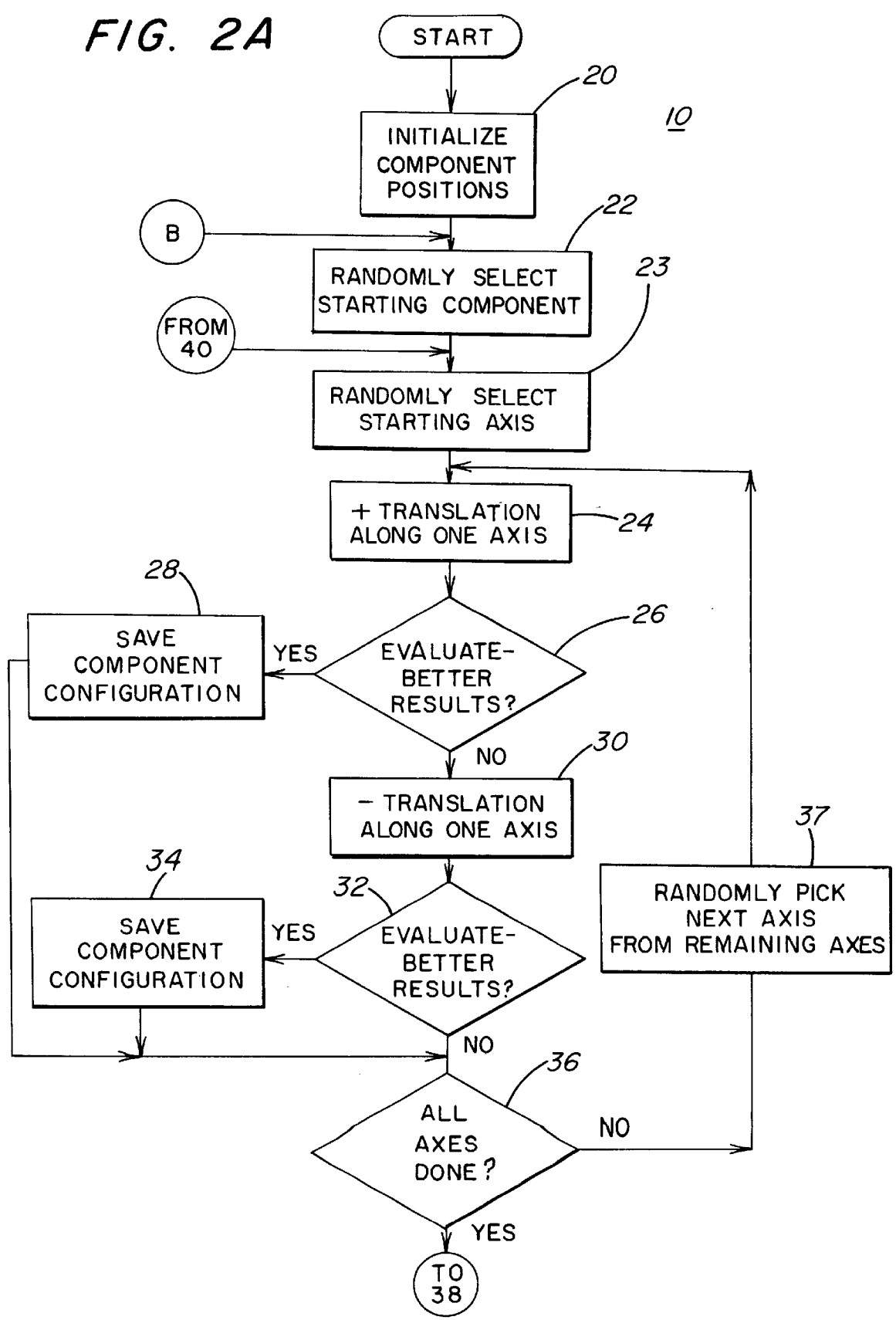
FIGS. 2A–2E are a high level block diagram illustrating the steps of the method of an embodiment of the present invention.
Figure 2B:
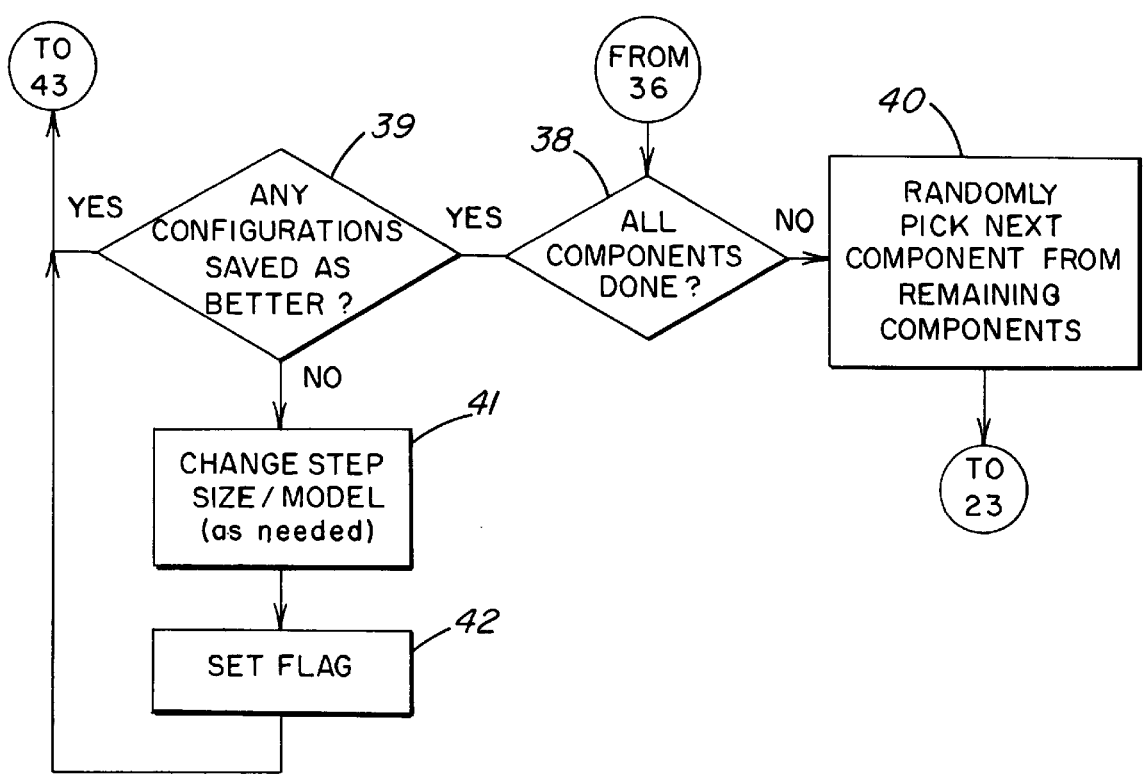

Component models and layout constraints are input to the optimization program 12. The component models may be simple geometric figures in the case of a two dimensional layout or routing problem or a hierarchical arrangement of a plurality of models of varying resolution in the case of a three dimensional layout or combined layout/component selection problem. The modeling of components and identification of constraints is known in the art and need not be discussed further. Turning to FIG. 2A, one embodiment of the method 10 begins at step 20 by selecting a model for each component, if there is more than one model from which to select. Generally, early in the process low resolution models are selected. The method initializes the orientation and position of the components into an initial configuration at step 20. That initialization randomly selects the orientation and position of the components. A single component and axis are chosen at random at steps 22 and 23, respectively. The configuration is now ready for movement operations to be performed on that component.

In the present embodiment of the invention, a positive translation is performed on the selected component along the selected axis at step 24. The effect of that component's translation on the value of the objective function is evaluated at step 26 according to the given criteria and is saved as the new or then current configuration at step 28 if the objective function shows improvement, however defined, over the prior configuration. The method then continues with step 36. Otherwise, the prior current configuration is maintained as the then current configuration and a negative translation is performed along the selected axis at step 30. The effect of the component's translation on the value of the objective function is evaluated at step 32. The configuration is saved at step 34 as the new current configuration if the negative translation produced an improvement, and the process proceeds to step 36. Otherwise the process proceeds directly to step 36 from step 32. The precise method by which the objective function is evaluated at steps 26 and 32 will be discussed below.

The aforementioned process steps are repeated for the chosen component along the remaining axes as shown by the decision step 36 and step 37 wherein the next axis is randomly picked from the remaining axes. The entire translation process is repeated as shown by the decision step 38 in FIG. 2B until the translation of each remaining component is performed and evaluated. The next component to be translated is randomly chosen from the remaining components as shown by step 40, and the process returns to step 23 in FIG. 2A.

Figure 2C:
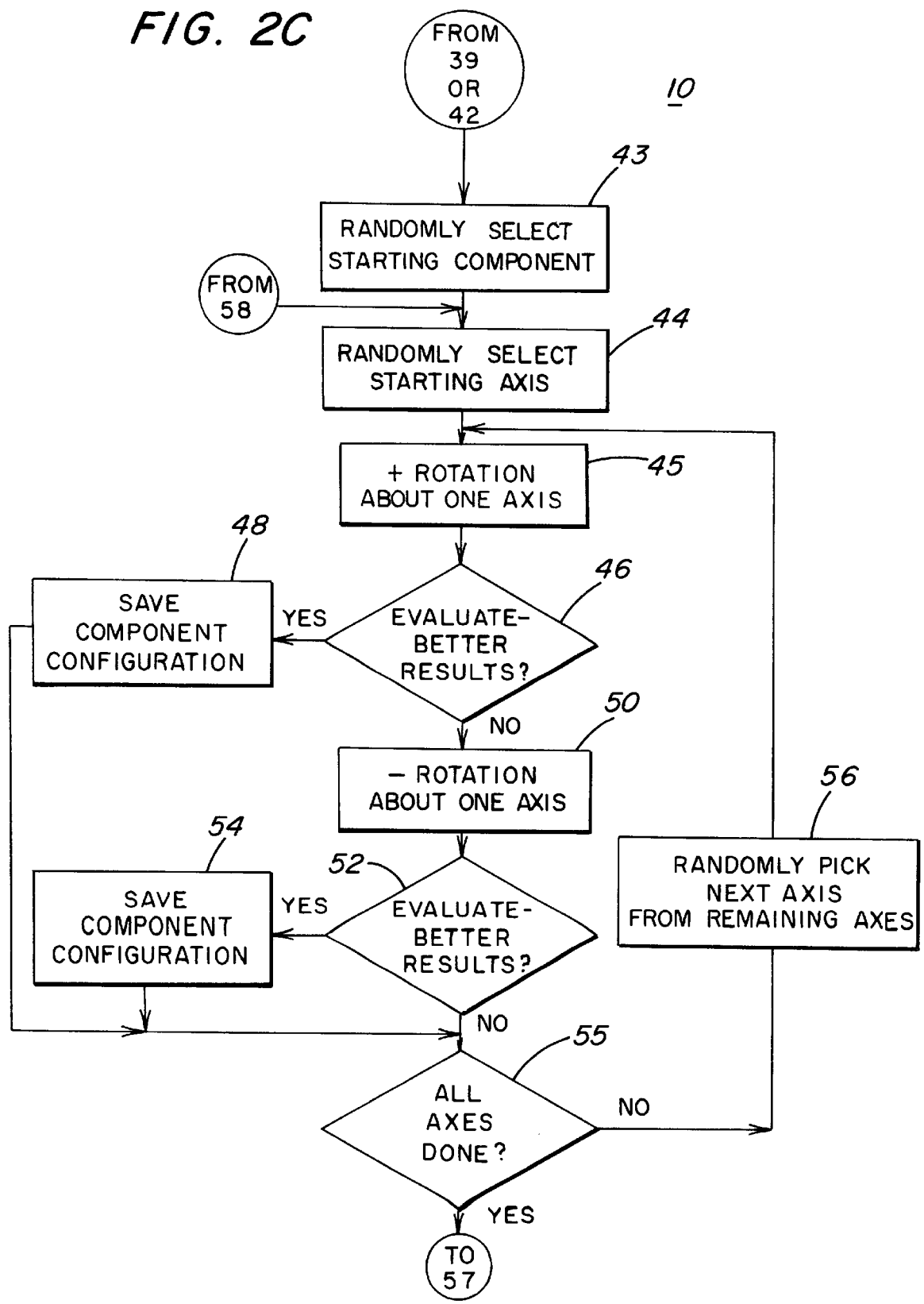

After all components are done as indicated by decision step 38, decision step 39 determines if any configurations have been saved as better. If yes, the process continues with step 43 in FIG. 2C. If no, step size is changed at step 41 and the model is changed, as needed, depending upon the new step size. A flag is set at step 42, and the process continues with step 43 in FIG. 2C.

In this embodiment of the present invention, once the translation process has been exhausted, the then current component configuration is the basis for the next movement operation of the optimization method 10. From the then current configuration, a component and a starting axis are chosen at random to be subjected to that movement operation at steps 43 and 44 in FIG. 2C, respectively. In this embodiment of the present invention, this second movement operation is rotation. It will be seen that the process steps for the rotational movement and evaluation are similar to the process steps for the translational movement and evaluation.

At step 45, a positive rotation is performed on the selected component along the selected axis. The effect of that component's rotation on the value of the objective function is evaluated at step 46 according to the aforementioned criteria and is either saved at step 48 as the new current configuration (if the objective function value has improved over the prior current configuration), or rejected (if no improvement is shown). The precise evaluation method used will be discussed below. If no improvement is seen, the process continues at step 50 using the same component and axis, but now the rotation is negative. Again, the objective function is evaluated. If an improvement is seen, the current configuration is saved at step 54. From steps 48, 54, or 52, the process proceeds to step 55.

Figure 2D:
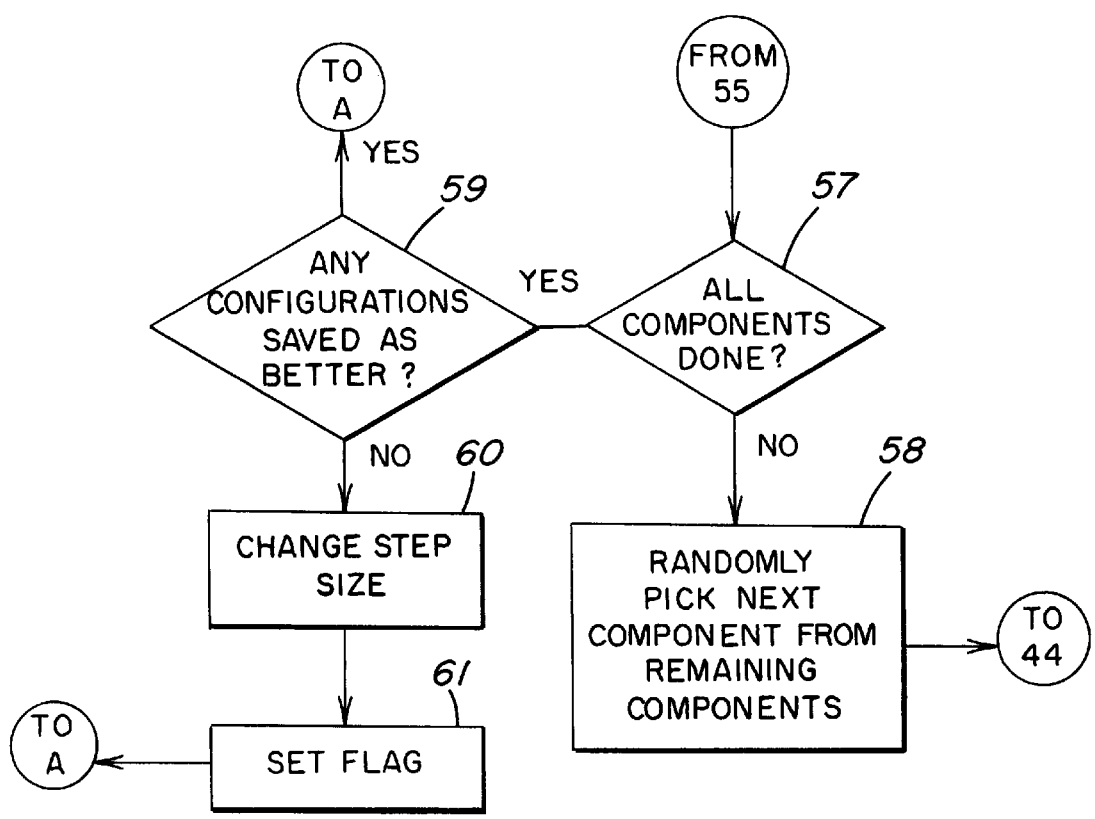

The above process steps concerning rotational movement are repeated for the chosen component for the remaining axes as shown by the decision step 55 and step 56 wherein the next axis is randomly picked from the remaining axes. The rotation process then repeats as shown by the decision step 57 in FIG. 2D until the rotation of each remaining component is performed and evaluated. The next component to be rotated is randomly chosen from the remaining components as shown at step 58, and the process returns to step 44 in FIG. 2C.

After all components are done as indicated by decision step 57, a decision step 59 determines if any configurations have been saved as better. If yes, the process continues with step 62 in FIG. 2E. If no, step size is changed at step 60. If a separate model is being used for rotational analysis, the model may be changed, as needed, depending upon the new step size. A flag is set at step 61, and the process then continues with step 62 in FIG. 2E.

It will be apparent to those skilled in the art that there are a great number of variations on the above scheme. For example, a different set or number of movement operations could be performed, numbering as few as one or as many as needed, and those operations could be performed in addition to or in substitution of the operations presented herein (i.e. rotation and translation). Furthermore, there is no significance to the order of movement operations as presented, either in the case of translation and rotation or in the case of positive and negative. Additionally, those operations could be randomly mixed.

Figure 2E:
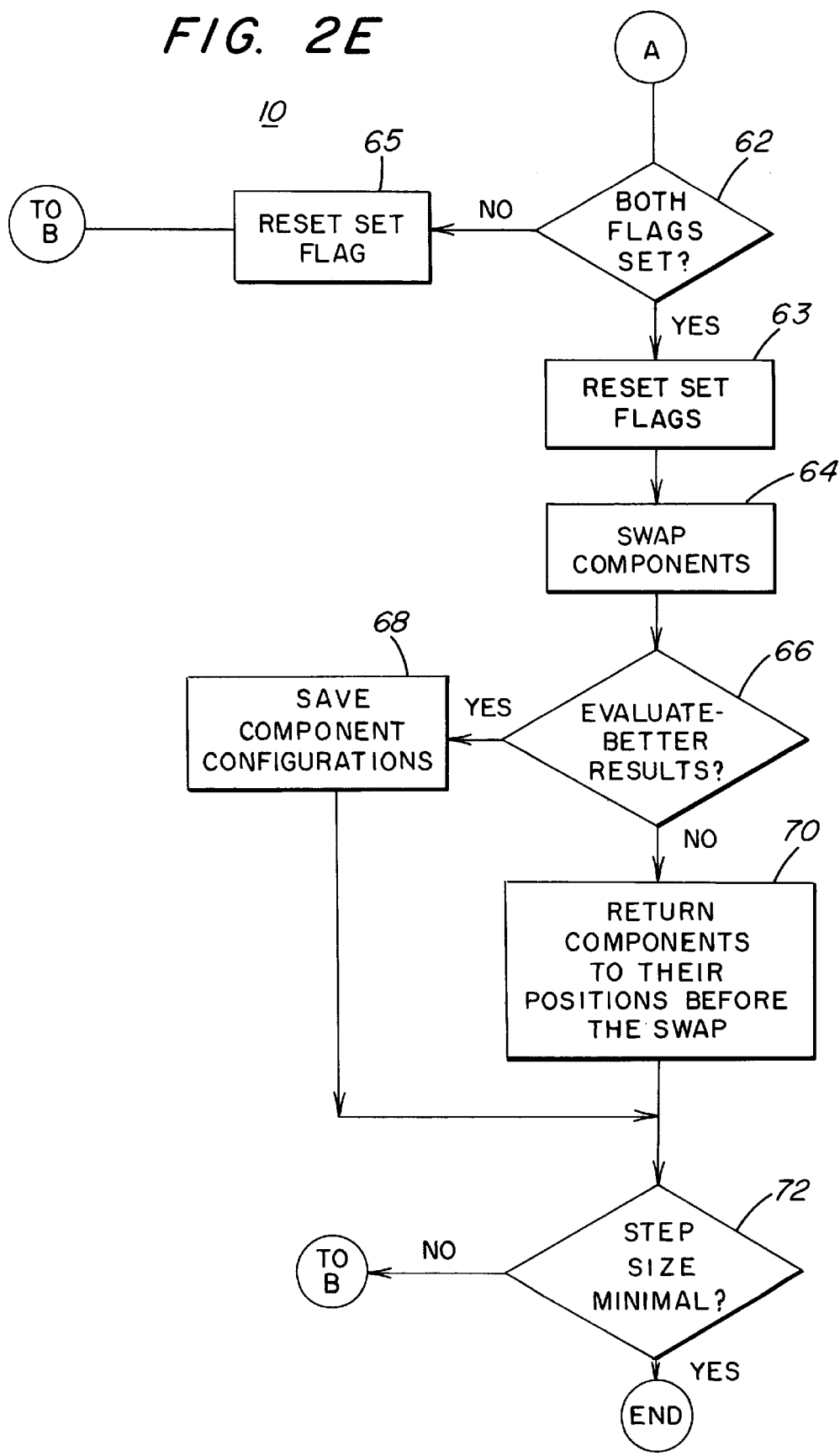

Once the process has reached step 62 in FIG. 2E, there either have or have not been configurations saved at steps 28, 34, 48, and 54 as reflected by testing for whether the flag is set. Any new configuration which was chosen to be saved in place of the initial or then current configuration was so chosen based on the evaluations performed at steps 26, 32, 46, and 52. The evaluations at steps 26, 32, 46, and 52 are based on the effect of any movement operation on the objective function. These effects are reflective of the considerations and criteria relevant to the layout in question: e.g., how dense are the components; how much of the component is outside the layout area; is there an overlap of components; are minimum/maximum spacing requirements satisfied; are components properly oriented; etc. Those criteria, and others, can be accounted for in the objective function in a variety of ways as well: articulation of the design goals, equality of constraints (arrangement either passes or fails); checking for prohibited moves; penalty points accumulated for violation of certain criteria (scoring method); a mix of hard and penalized constraints; etc. The various methods of evaluating an objective function are known to those of ordinary skill in the art such that further description thereof is not necessary. Hard constraints may also be directly incorporated into the pattern.

If there has been at least one layout saved as better, then both flags will not be set. In that case, the process repeats by returning to step 22 in FIG. 2A after resetting at step 65 any set flags. If there have not been any layouts accepted as better, i.e., both flags are set, then the set flags are reset at step 63 and a perturbation is provided by, for example, the exchange or swapping of component positions at step 64. At step 66, the objective function is evaluated to see if the component swap resulted in any improvement. If it did, then the configuration is saved as the new current configuration at step 68. If it did not result in any improvement, the components are returned to their position before the swap at step 70. From either step 68 or step 70, the process continues with step 72. Those of ordinary skill in the art will recognize that step 64 could be performed in many locations throughout the method 10 such that the present invention is not limited to the embodiment shown in FIGS. 2A and 2E. Furthermore, in some applications, the swap may not be necessary.

There are at least three variations for determining if the step size is minimal at step 72. First, the size of steps used just for translation may be checked. Secondly, both the move size for translations and rotations may be checked. If one is minimal, but the other is not, then you could return to just the loop, translation or rotation, for which move size is not yet minimal. In a third alternative, if one move size is minimal and the other is not, then you could go through both the translation and the rotation loop while freezing the move size for that motion, translation or rotation, which is already minimal. In the preferred embodiment, it has been found that the move size for translation dominates the move size for rotation. Accordingly, only the move size for translation is checked at step 72 to determine if it is minimal. If the step size is minimal, the process ends. If the step size is not minimal, the then current component positions and orientations are maintained and the process returns to step 22 in FIG. 2A.

Figure 3:
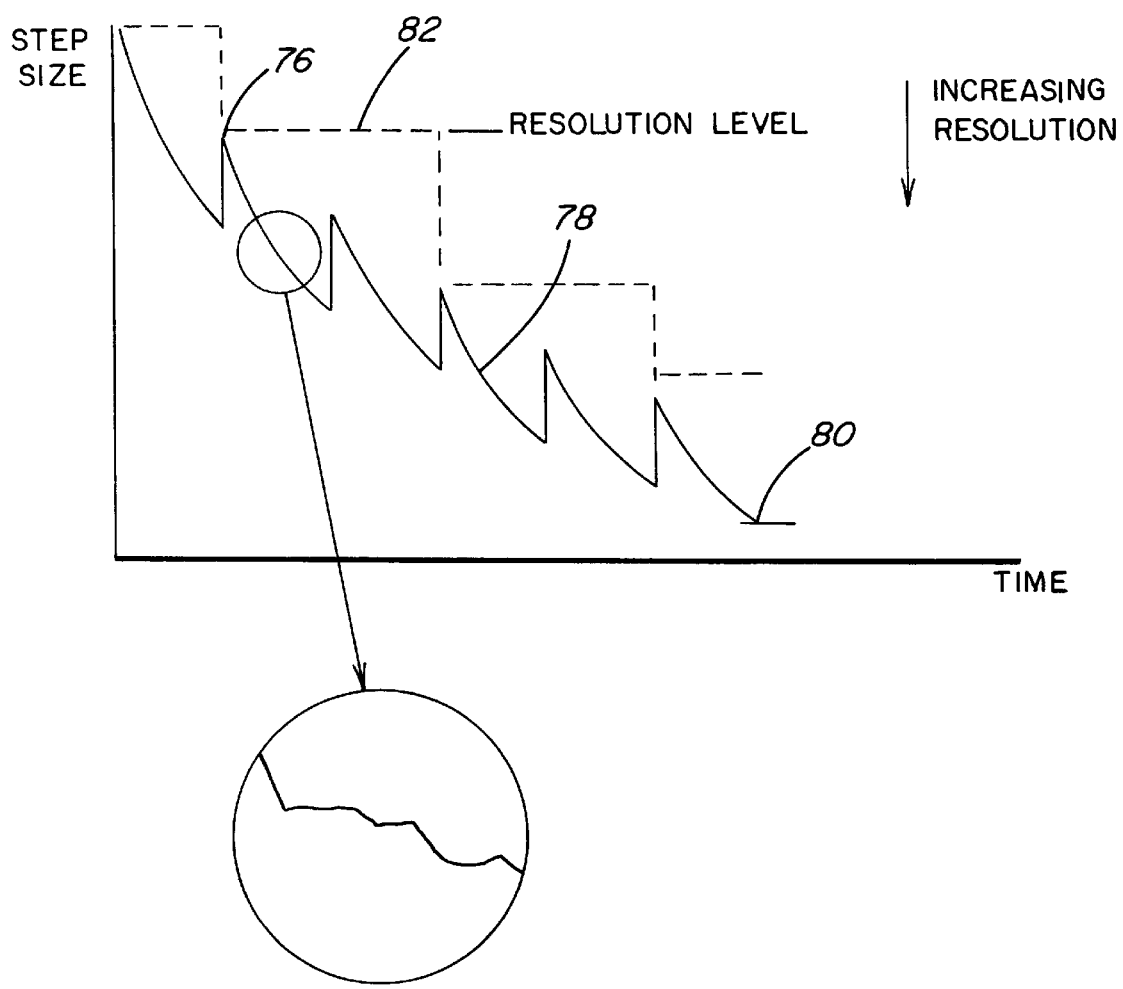
FIG. 3 is a graphical representation of the gradual reduction of, and periodic increase in, move size.

The process as described above is an iterative process. The variation in move size from certain iterations to the next is evidenced in FIG. 3. Where there is no change in move size from one iteration to the next, the line becomes flat as shown in the insert in FIG. 3. However, the move size does decrease over time. In general, the move size is gradually decreased throughout performance of the method. However, in the present invention, a perturbation is provided whereby the move size is increased as shown at 76, and between those increases the move size is characterized by a gradual decrease 78. The increase 76 in move size may be performed at random intervals, performed according to a heuristic, or performed at periodic intervals. The sole condition on the increase in move size is that the move size should be allowed to eventually decrease to a user or program selected minimum 80. It is preferred that the increase in move size be such that the increase does not create a net increase in move size over a substantial time interval, where substantial time is gauged in relation to the total optimization time. Those skilled in the art will recognize that any heuristic to increase move size at intervals can be used. These increases in move size provide a better exploration of the search space and provide assurance that the optimization will not settle quickly into any inferior local optima. However, in some applications, such increases in move size may not be necessary.

The hierarchy of models, if present, allows for the use of different resolution models such that a resolution level 82 (represented by the dotted line in FIG. 3) commensurate with move size may be maintained. In this embodiment of the present invention, run time is further enhanced by changing the resolution level or model as previously described in conjunction with steps 41 and 60 based on the move size, e.g., the larger the move size the lower the level of resolution.

The method of the present invention as presented herein has provided an improvement in speed of optimization of 10–100 times over the prior art. Furthermore, the method of the present invention has provided improved quality of solution. The optimization method of the present invention may be used to provide a solution at the same resolution as the prior art in much less time than the prior art, or a solution of significantly higher resolution than the prior art in the same time the prior art would take at a lower resolution.

In addition, the method of the present invention provides a significant step in the solution of the problem of the optimization process settling on an inferior optimum. The component swap and increase in move size provide for an improved exploration of the search space for global, rather than inferior local, optima. The stochastic pattern based search of the present invention does not rely upon large samples of move sizes and directions to create statistics to guide the search. Rather, the stochastic pattern based search of the present invention takes advantage of the layout search space characteristics. Simple moves are relied upon, with large steps taken for exploration of the search space and smaller steps for exploration of individual neighborhoods. Swapping of components occurs only when needed, and step jumps are provided only occasionally, both to avoid settling too soon on inferior local optima.

The robust nature of the present invention provides numerous other advantages. First, the present invention as herein presented can handle any type of component geometry subject to any user selected constraints. These constraints can be accounted for in a single-objective or in a multi-objective function, with no substantial additional time costs due to complex evaluation. Time is saved due to the optional use of simplistic models when move size is large, and the use of precise models when move size is small. This enables the routine to perform minimal analysis to determine the change in constraint violations and to evaluate the goals. Time is also saved due to the lack of the need to perform complex evaluations for determining when to make moves and which moves to make, and the lack of the need to perform a component swap at every pass through the optimization routine.

The nature of the present invention allows new objective functions to be readily added, e.g., a routing algorithm as discussed below. Additionally, the evaluation of these objectives can be easily varied to check for other considerations, such as vibrations or thermal considerations, for example. Finally, any number of movement operations can be performed on a component, and the effect of such an operation can be evaluated in two or three dimensions. The component can be rotated and/or translated, positively and/or negatively, as is the case in the embodiment herein described, or it can be moved in any variation thereof, such as a movement along the path of a mathematical function.

Depending on the constraints applied to the movement operation, the method of the present invention can be used to solve two and three dimensional problems in such areas as packing, which is directed primarily to issues of density, and layout, which involves constraint satisfaction. Some examples of packing problems include shipping compartments, storage compartments, cargo packing, cargo bays, cutout masking, etc. Some examples of layout problems include the layout of automobile engine compartments, VLSI and PC boards, electro-mechanical designs, HVAC systems, plant layout, etc. In addition, component selection can be performed as part of the packing or layout analysis.

The present invention, as mentioned, can also be used to solve routing problems, a specialized class of layout problems. Instead of translations and rotations, the moves may include adding a bend, moving a bend, or removing a bend. As each route is evaluated, the options of adding, moving, or removing a bend can be individually evaluated. The addition of a bend may be performed by drawing a sphere using two points of interest, identifying a point anywhere in the sphere, and moving the center of a line connecting the two points of interest to the point added in the sphere. As can be seen from this simple example, the technique of the present invention is extremely versatile.

The present invention has been described in connection with the preferred embodiments thereof. Those of ordinary skill in the art will recognize that many modifications and variations may be employed. All such modifications and variations are intended to be covered by the foregoing description and the following claims.

What is claimed is:

1. A method of solving one of a packing and layout problem comprising:

applying a pattern based search technique to each component in an initial component configuration to determine an optimal component configuration based on a predetermined criterion, wherein said each component is selected randomly from all available components; and introducing at least one perturbation into the search, wherein the perturbation interrupts a pattern in the pattern based search technique.

2. The method of claim 1 wherein the pattern based search technique is applied to each available component and wherein said each component is selected randomly from a subset of all available components.

3. The method of claim 1 herein said pattern based search proceeds from said initial component configuration to said optimal component configuration through a series of then current component configurations, and wherein said step of introducing at least one perturbation into the search includes the step of randomly swapping the positions of certain of said components within one of said then current component configurations.

4. The method of claim 1 wherein said pattern based search proceeds from said initial component configuration to said optimal component configuration through a series of then current configurations produced by moving certain components within a configuration, said pattern based search including the step of periodically reducing the size of said movements, and wherein said step of introducing at least one perturbation into the system includes the step of increasing the size of said movements.

5. The method of claim 4 wherein said move size is increased randomly.

6. The method of claim 4 wherein said move size is increased according to a heuristic.

7. The method of claim 4 wherein said move size is increased periodically.

8. The method of claim 1 wherein said pattern based search includes the steps of selecting a level of resolution and evaluating each configuration of the components according to said selected level of resolution.

9. The method of claim 8 wherein said pattern based search includes the step of reducing the size of the movements of the components over time, and wherein said step of selecting a level of resolution is related to said move size.

10. A method, comprising:

initializing a plurality of components into an initial current component configuration;

performing a series of moves on each of said plurality of components in a current component configuration to produce a series of new current component configurations, wherein each of said plurality of components is selected randomly from all available components in said initial current component configuration;

evaluating each of said new current component configurations and saving certain of said new current component configurations;

reducing the size of the component moves over time;

repeating the steps of performing, evaluating, and reducing until a predetermined criterion is met; and perturbing the method at least once before the predetermined criterion is met, wherein the perturbation interrupts a pattern of the series of moves.

11. The method of claim 10 wherein the series of moves is performed on each available component in a current component configuration and wherein said each component is selected randomly from a subset of all available components in said initial component configuration.

12. The method of claim 10 wherein said step of perturbing the method includes the step of randomly exchanging the positions of certain components to produce a new current component configuration.

13. The method of claim 10 wherein said step of perturbing the method includes the step of increasing the size of the component moves.

14. The method of claim 10 wherein said step of evaluating includes the step of selecting a level of resolution and wherein said step of evaluating is carried out using the selected level of resolution.

15. The method of claim 10 wherein said step of evaluating includes the step of evaluating according to two-dimensional layout criteria.

16. The method of claim 15 wherein said step of evaluating includes the step of evaluating according to functional criteria.

17. The method of claim 10 wherein said step of evaluating includes the step of evaluating according to three-dimensional layout criteria.

18. The method of claim 17 wherein said step of evaluating includes the step of evaluating according to functional criteria.

19. A method of determining component layout comprising the steps of:
- establishing an initial component configuration;
- performing a series of translational and rotational moves on each of said components according to a preselected order to produce a series of new component configurations, wherein each of said components is selected randomly from all available components;
- scoring each of said new component configurations according to at least one of layout and functional constraints;
- saving those configurations which produce a better score;
- reducing the size of the component moves over time;
- repeating the steps of performing, scoring, saving, and reducing until a predetermined criterion is met; and
- perturbing the method at least once before the predetermined criterion is met, wherein the perturbation interrupts a pattern of the series of the translational and rotational moves.

20. The method of claim 19 wherein each of said components is selected randomly from a subset of all available components.

21. The method of claim 19 additionally comprising the step of prohibiting any translational and rotational moves that violate any layout and functional constraints.

22. An apparatus, comprising:
- means for performing a pattern based search on each component in a plurality of components to determine an optimal configuration of said components, said components selected randomly from all available components; and
- means for introducing at least one perturbation into the search, wherein the perturbation interrupts a pattern in the pattern based search.

23. The apparatus of claim 22 wherein said means for introducing at least one perturbation includes means for randomly exchanging the positions of certain components.

24. The apparatus of claim 22 wherein said means for performing a pattern based search includes means for reducing the size of the movements of the components, and wherein said means for introducing at least one perturbation into the search includes means for increasing the size of said movements.

25. The apparatus of claim 22 wherein said means for performing a pattern based search includes means for selecting a level of resolution and means for evaluating a plurality of component configurations according to the selected level of resolution.

26. The apparatus of claim 25 wherein said means for selecting a level of resolution also changes the size of the movements of the components.

* * * * *